J. S. CUNNINGHAM.
Chain Propeller.
No. 94,573.
Patented Sept. 7, 1869.
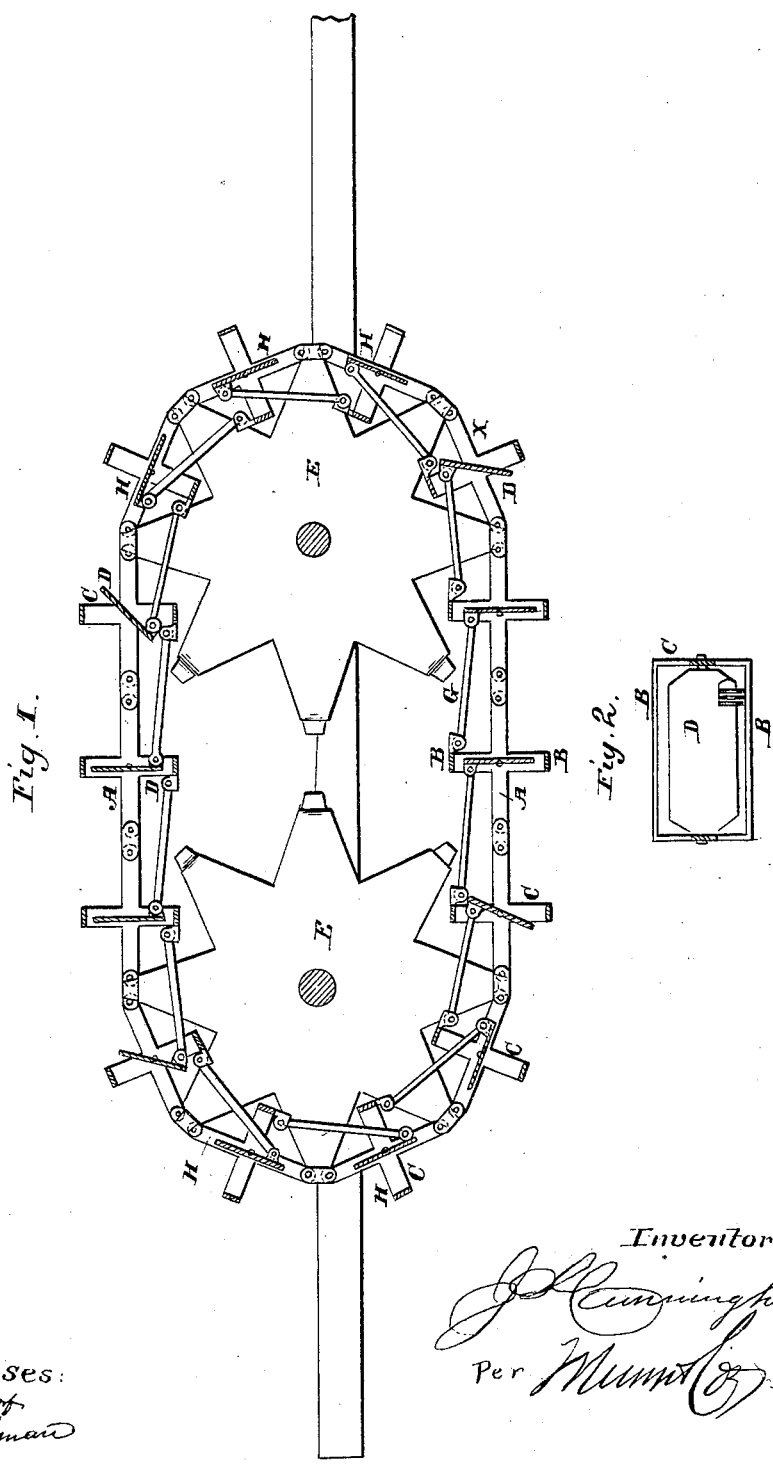

United States Patent Office.

JAMES S. CUNNINGHAM, OF NEW YORK, N. Y., ASSIGNOR TO HIMSELF AND GEORGE LE CRONIER, OF SAME PLACE.

Letters Patent No. 94,573, dated September 7, 1869.

IMPROVEMENT IN PROPELLING-APPARATUS.

The Schedule referred to in these Letters Patent and making part of the same.

*To all whom it may concern:*

Be it known that I, JAMES S. CUNNINGHAM, of the city of New York, in the county and State of New York, have invented a new and useful Improvement in Propelling-Wheels; and I do hereby declare that the following is a full, clear, and exact description thereof, which will enable others skilled in the art to make and use the same, reference being had to the accompanying drawing, forming part of this specification.

This invention relates to improvements in that class of boat-propelling wheels, wherein the floats are connected to endless chains working over two wheels, for the purpose of giving them a direct horizontal movement in the water, and for governing their position when dipping into or escaping from the water.

The invention consists in an improved arrangement of the buckets for governing their position while dipping and escaping from the water, and also for holding them against the resistance of the water, all as hereinafter more fully specified.

Figure 1 represents a longitudinal sectional elevation of my improved propelling-wheel.

Figure 2 represents a detail view.

Similar letters of reference indicate corresponding parts.

A represents the endless chain, the two opposite members of which are united by transverse bars B, connected to projections C, perpendicular to the links of the chains forming yokes, in the centre of which the buckets, or floats D, are pivoted.

These chains work on chain-wheels E, in the usual way.

Each bucket is connected, at the inner edge, by a rod, G, to the inner part of the yoke next in advance of it. These rods are connected, by hinge-joints at each end, to both the said parts, so as to oscillate freely.

The said rods are so calculated, in respect of their length, that when the chain is in the horizontal position the floats will be held in vertical planes, but when the chain passes over the wheels, and bends out of the straight line, so as to shorten the distance between points of the connection of the rods G with the yokes and the pivots of the buckets, they will be turned into planes parallel with the links, as shown at H, so that when they enter the water, or pass out of it, their edges only will be presented in the direction of their movement.

When the said buckets arrive near the bottom of the wheels, they are turned into the vertical position for action on the water, as represented at $x$.

This arrangement is very simple, and may be cheaply constructed. By it feathering buckets, well adapted for propelling boats, with but little disturbance of the water, and especially adapted for propelling canal-boats, may be made to operate with great efficiency.

Having thus described my invention,

What I claim as new, and desire to secure by Letters Patent, is—

The combination of the chains A, yokes B C, buckets D, and connecting-rods G, when arranged substantially as specified.

The above specification of my invention signed by me, this 3d day of May, 1869.

J. S. CUNNINGHAM.

Witnesses:
FRANK BLOCKLEY,
C. L. TOPLIFF.